US 9,475,537 B2

(12) United States Patent
Hartmann

(10) Patent No.: US 9,475,537 B2
(45) Date of Patent: Oct. 25, 2016

(54) FOLDING BICYCLE

(71) Applicant: Markus Hartmann, Mauerstetten (DE)

(72) Inventor: Markus Hartmann, Mauerstetten (DE)

(73) Assignee: H Young (Operations) Limited, Newbury (GB)

( * ) Notice: Subject to any disclaimer, the term of this patent is extended or adjusted under 35 U.S.C. 154(b) by 0 days.

(21) Appl. No.: 14/384,804

(22) PCT Filed: Mar. 7, 2013

(86) PCT No.: PCT/EP2013/054623
§ 371 (c)(1),
(2) Date: Sep. 12, 2014

(87) PCT Pub. No.: WO2013/135560
PCT Pub. Date: Sep. 19, 2013

(65) Prior Publication Data
US 2015/0021876 A1    Jan. 22, 2015

(30) Foreign Application Priority Data
Mar. 13, 2012   (DE) ........................ 10 2012 203 859

(51) Int. Cl.
| B62K 15/00 | (2006.01) |
| B62K 21/24 | (2006.01) |
| B62K 23/06 | (2006.01) |
| B62K 25/16 | (2006.01) |
| B62M 1/36 | (2013.01) |

(52) U.S. Cl.
CPC ............. B62K 15/008 (2013.01); B62K 21/24 (2013.01); B62K 23/06 (2013.01); B62K 25/16 (2013.01); B62M 1/36 (2013.01)

(58) Field of Classification Search
CPC ... B62K 15/00; B62K 15/006; B62K 15/008
USPC .................................................. 280/278, 287
See application file for complete search history.

(56) References Cited

U.S. PATENT DOCUMENTS

| 5,590,895 A | 1/1997 | Hiramoto | |
| 6,702,312 B1 * | 3/2004 | Miksik | 280/287 |
| 6,799,771 B2 * | 10/2004 | Bigot | 280/278 |
| 7,367,576 B2 * | 5/2008 | Pan | 280/278 |

(Continued)

FOREIGN PATENT DOCUMENTS

| CN | 2222115 | 3/1996 |
| CN | 2321695 | 6/1999 |

(Continued)

OTHER PUBLICATIONS

International Search Report and Written Opinion dated May 27, 2013.

(Continued)

Primary Examiner — Tony Winner
(74) Attorney, Agent, or Firm — Thomas | Horstemeyer LLP

(57) ABSTRACT

A folding bicycle having a frame which extends in the main plane of extent, a front wheel which can be pivoted about a first axis which extends perpendicularly with respect to the main plane of extent, and a rear wheel which can be pivoted about a second axis which extends perpendicularly to the main plane of extent, wherein the frame has a joint such that the front and rear wheel can be pivoted with respect to one another about a third axis which extends perpendicularly with respect to the roadway.

21 Claims, 18 Drawing Sheets

(56) References Cited

U.S. PATENT DOCUMENTS

| | | | |
|---|---|---|---|
| 8,430,414 B1 | 4/2013 | Yap | |
| 2005/0001404 A1* | 1/2005 | Mihelic | 280/278 |
| 2005/0035570 A1* | 2/2005 | Chu | 280/278 |
| 2005/0116441 A1* | 6/2005 | Chang | 280/278 |
| 2007/0205577 A1 | 9/2007 | Lau | |
| 2010/0212978 A1 | 8/2010 | Huang | |
| 2010/0230927 A1 | 9/2010 | Huang | |
| 2010/0283221 A1 | 11/2010 | Yeh | |
| 2011/0193313 A1* | 8/2011 | Yun | 280/278 |

FOREIGN PATENT DOCUMENTS

| | | |
|---|---|---|
| CN | 201842193 | 5/2011 |
| DE | 4313832 | 11/1994 |
| DE | 202004005265 | 7/2004 |
| DE | 60014436 | 3/2006 |
| DE | 202012002736 | 7/2012 |
| EP | 0026800 | 4/1981 |
| EP | 2060480 | 5/2009 |
| EP | 2489583 | 8/2012 |
| FR | 2225328 | 11/1974 |
| GB | 2451689 | 2/2009 |
| GB | 2499586 | 8/2013 |
| JP | 10119861 | 5/1998 |
| JP | 2001146188 | 5/2001 |
| JP | 5330473 | 10/2013 |
| KR | 2020100009734 | 10/2010 |
| KR | 1020120000374 | 1/2012 |
| TW | 201107179 | 3/2011 |
| WO | 2004024546 | 3/2004 |
| WO | 2004110852 | 12/2004 |
| WO | 2011161657 | 12/2011 |

OTHER PUBLICATIONS

Brompton Bicycle—Owner's Manual, Brompton Bicycle Ltd, Kew Bridge Distribution Centre, Lionel Road, Brentford, Middlesex TW8 9QR. (and at www.bromptonbicycle.co.uk) Apr. 2002.
Chan, Ying; Luong, Bang; Nugent, David; Sunil, Shakya; and Soares, Brian, "Design and construction of a collapsible bicycle: phase II" (1997). Mechanical Engineering Undergraduate Capstone Projects. Paper 28.http://handle.net/2047/d10010804, Apr. 21, 1997.

* cited by examiner

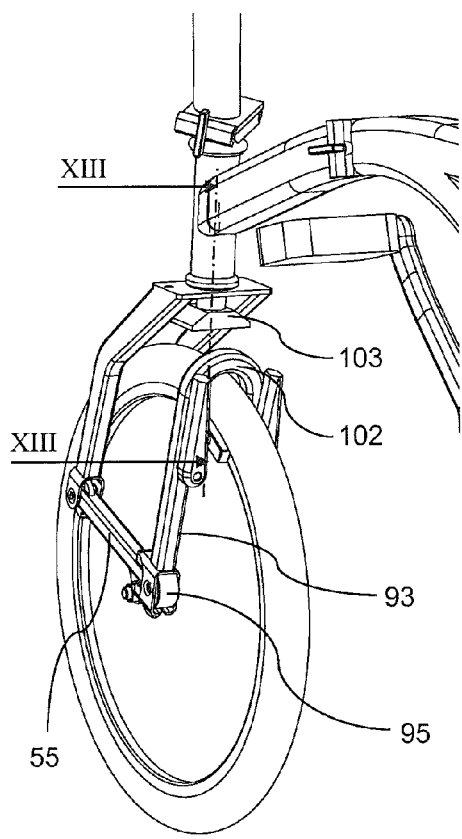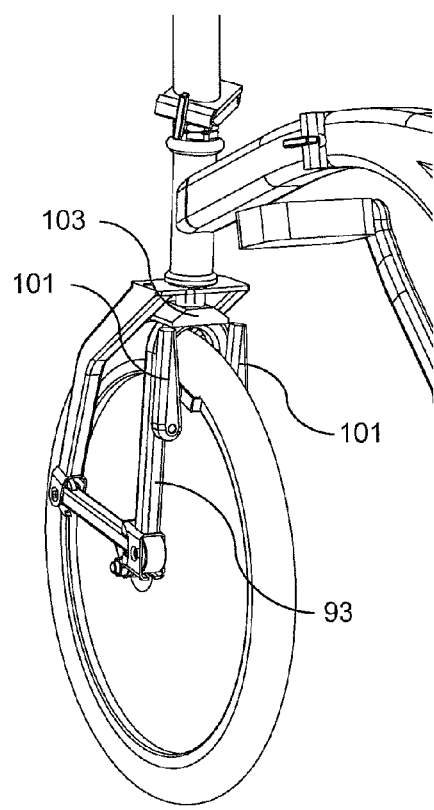
Fig. 12 A
Fig. 12 B (XIII – XIII)

FOLDING BICYCLE

CROSS-REFERENCE TO RELATED APPLICATION

This application is the 35 U.S.C. §371 national stage of, and claims priority to and the benefit of, PCT application PCT/EP2013/054623, filed Mar. 7, 2013, which claims priority to and the benefit of German Application No. 10 2012 203 859.0 13, filed on Mar. 13, 2012, herein incorporated by reference in its entirety.

The present invention relates to a folding bicycle.

Conventional folding bicycles have a riding position and a transporting position. In the riding position of the folding bicycle, a user can ride the folding bicycle. In the transporting position of the folding bicycle, the latter is folded together and can be stored in a space-saving manner.

Folding bicycles are optimized for different purposes. For example, there are folding bicycles which are designed specifically as a supplemental means of mobility to an automobile. Such folding bicycles generally have a range of 5-10 km, which corresponds to conventional "Park & Ride" distances. Furthermore, such folding bicycles have a comparatively small packing size, such that they can be accommodated in a trunk of a small car.

It is an object of the present invention to provide an improved folding bicycle. The latter should have a packing size that is as small as possible while simultaneously ensuring good riding properties.

This object is achieved by a folding bicycle having the features of claim 1.

Accordingly, a folding bicycle having a frame, a front wheel and a rear wheel is provided. The frame extends in a main extension plane. The front wheel is pivotable about a first axis extending perpendicularly to the main extension plane. The rear wheel is pivotable about a second axis extending perpendicularly to the main extension plane. The frame has an articulation such that the front and rear wheels are pivotable with respect to one another about a third axis extending perpendicularly to the roadway.

As a result, a packing size that is not only small but also geometrically favorable can be achieved. This makes it possible to accommodate the folding bicycle in a trunk of a small car in a longitudinally positioned manner in its transporting position. This means that the folding bicycle fills the space bounded by the rear seat on the one hand and a perpendicular inner wall, defining the trunk opening, on the other hand. Such longitudinal positioning of the folding bicycle entails a number of advantages. For example, the folding bicycle does not have to be rotated first in order to be accommodated in the trunk. Furthermore, storage space is scarcely lost, since the folding bicycle is arranged in a more or less fitting manner between the rear bench seat and the inner wall. Furthermore, a longitudinally positioned folding bicycle stands in a relatively stable manner and can be secured easily. During acceleration processes, a longitudinally positioned folding bicycle rarely falls over and so damage to other articles transported in the trunk or damage to the automobile itself can be avoided. Furthermore, in this way, a plurality of longitudinally positioned folding bicycles can be positioned alongside one another in the transverse direction of the automobile.

Furthermore, on account of its small and geometrically favorable packing size, the folding bicycle can be accommodated in a spare wheel well—rather than in the trunk itself—of an automobile itself. The spare wheel well is no longer used in many automobiles, since these carry a tire repair kit rather than the spare wheel. If the folding bicycle is accommodated in the spare wheel well, no storage space is lost in the trunk.

Where the terms perpendicular or parallel are used in the present case, these also include deviations from the perpendicular or parallel of 0 to 45°, preferably 0 to 30°, more preferably 0 to 20°, even more preferably 0 to 10°, even more preferably 0 to 5° and even more preferably 0 to 3°.

Advantageous embodiments of the invention can be gathered from the dependent claims.

According to one embodiment, the frame has a headset bearing by means of which the front wheel is rotatably mounted in order to steer same, and a seatpost bearing which supports a seatpost, wherein the articulation is arranged centrally in the direction of travel between the headset bearing and the seatpost bearing. Thus, in a folded transporting position of the folding bicycle, the headset bearing comes to lie in the vicinity of the seatpost bearing. The term "centrally" in the present case also includes deviations from precisely centrally of 0 to 20 cm, preferably 0 to 10 cm, more preferably 0 to 5 cm, even more preferably 0 to 3 cm, wherein the measurement is carried out from a respective central axis of the headset bearing and of the seatpost bearing.

According to a further embodiment, the folding bicycle is adjustable between a riding position and a transporting position, wherein the headset bearing and the seatpost bearing are arranged alongside one another in the transporting position. The expression "alongside one another" means that the distance between the headset bearing and the seatpost bearing in the transporting position is less than 20 cm, preferably less than 10 cm, even more preferably less than 5 cm and even more preferably less than 3 cm, wherein the measurement is carried out from a respective central axis of the headset bearing and of the seatpost bearing.

According to a further embodiment, in order to adjust the folding bicycle, the front wheel is pivotable in the direction of travel between a riding position and a transporting position of said folding bicycle. As a result, the front wheel passes into an advantageous position with regard to a small packing size.

According to a further embodiment, in order to adjust the folding bicycle, the rear wheel is pivotable in the direction of travel between a riding position and a transporting position of said folding bicycle. As a result, a favorable position of the rear wheel with regard to a small packing size is achieved.

According to a further embodiment, in order to adjust the folding bicycle between a riding position and a transporting position thereof, the front wheel is pivotable about the first axis and the rear wheel is pivotable about the second axis in the same direction. As a result, the front wheel and rear wheel are positioned in a favorable manner with respect to one another with regard to a small packing size. Furthermore, pivoting in the same direction affords ergonomic advantages.

According to a further embodiment, the folding bicycle is adjustable between a riding position and a transporting position, wherein, at least in the riding position, a rotation axis of the front wheel is located behind the first axis. As a result, lifting of the front part of the folding bicycle causes pivoting about the first axis in the direction of travel on account of the acting gravitational force of the front wheel. This is ergonomically favorable.

According to a further embodiment, the folding bicycle has a head tube and a front wheel swing arm. At its one end, the front wheel swing arm is mounted pivotably on the head tube. At its other end, the front wheel swing arm supports the front wheel in a rotatably mounted manner. In order to adjust the folding bicycle between a riding position and a transporting position thereof, the front wheel swing arm is pivotable between a first pivoted position and a second pivoted position. In the first pivoted position, the rotation axis of the front wheel is arranged on one side of the head tube. In the second pivoted position, the rotation axis of the front wheel is arranged on the other side of the head tube. As a result, a favorable position of the front wheel (second pivoted position) with regard to a small packing size is achieved. Where the term "tube", or head tube, is used in the present case, this includes all cross sections, for example hollow profiles or cross sections made of solid material. A characteristic factor for the tubes in the present case is that they have a more or less constant cross section in the longitudinal direction. In this case, the longitudinal direction does not have to follow a straight line but can also be curved.

According to a further embodiment, the folding bicycle has a fixing device for fixing the front wheel swing arm in the first and/or second pivoted position. As a result, automatic adjustment of the front wheel between the first and second pivoted positions is prevented, and this results in easier handling of the folding bicycle.

According to a further embodiment, the fixing device has a locking position and a releasing position. In the locking position, the front wheel is prevented from pivoting between the first and second pivoted positions. In the releasing position, the front wheel is allowed to pivot between the first and second pivoted positions. Furthermore, the folding bicycle has a cable pull by means of which the fixing device is adjustable between the locking position and the releasing position. The cable pull, also known as a Bowden cable, allows ergonomically favorable actuation of the fixing device by a user.

According to a further embodiment, the cable pull has a lever, arranged on a handlebar of the folding bicycle, for adjusting the fixing device between the locking position and the releasing position. Such a lever can be actuated in an ergonomically particularly easy manner.

According to a further embodiment, the fixing device has a detent disk fastened to the front wheel swing arm, and a locking element that is guided in a linear manner in or on the head tube and is adjustable by means of the cable pull. The locking element is in engagement with a detent of the detent disk in the locking position of the fixing device. The locking element is disengaged from the detent in the releasing position of the locking device. This results in a mechanism that is easy to produce. Furthermore, the detent disk can also have a plurality of detents, for example a first and a second detent. The first detent is assigned to the first pivoted position of the front wheel and the second detent is assigned to the second pivoted position of the front wheel. The detent disk can be composed of two circle segments that are set against one another, wherein one circle segment has a larger radius than the other circle segment. This results in two steps which form the first and second detents.

According to a further embodiment, the locking element is secured against falling out by means of a bayonet closure in the head tube. The detent disk prevents the locking element from rotating in order to release the bayonet closure. This results in a simple assembly of the locking element.

According to a further embodiment, the folding bicycle is adjustable between a riding position and a transporting position and has a head tube and a front wheel swing arm. At its one end, the front wheel swing arm is mounted pivotably on the head tube. At its other end, the front wheel swing arm supports the front wheel in a rotatably mounted manner. The head tube is formed in an elbowed manner in the main extension plane in order to leave room for a pedal and/or bottom bracket cradle of the folding bicycle in the transporting position of the folding bicycle. As a result, the headset bearing can be folded up close to the seatpost bearing without the head tube colliding with the pedals or the bottom bracket cradle.

According to a further embodiment, the folding bicycle has a head tube, a front wheel swing arm and a spring. At its one end, the front wheel swing arm is mounted pivotably on the head tube. At its other end, the front wheel swing arm supports the front wheel in a rotatably mounted manner. By means of the spring, the front wheel swing arm is supported on the head tube. Thus, the folding bicycle is equipped with a front wheel suspension which increases riding comfort. Specifically when high-pressure tires are used for the front wheel and rear wheel, this has the particular effect of increasing the riding comfort. High-pressure tires advantageously reduce the rolling resistance of the folding bicycle.

According to a further embodiment, the folding bicycle has a headset bearing which holds the head tube in a rotatably mounted manner with respect to the frame, wherein the spring is arranged at least partially within the head tube and/or the headset bearing. As a result, the spring is accommodated in a particularly space-saving manner.

According to a further embodiment, the folding bicycle has a strut which is supported on one side on the front wheel swing arm and on the other side on the spring. As a result, transmission of force from the front wheel swing arm to the spring is ensured in a simple manner. Preferably, the strut carries a brake, in particular a cantilever brake, for braking the front wheel. Such a brake then deflects together with the front wheel.

According to a further embodiment, provision is made of a coupling part which on one side acts against the spring and on the other side has an insertion bevel for receiving the strut. As a result, the strut can be easily brought into operative connection with the spring.

According to a further embodiment, the folding bicycle has a compensating element, in particular an elastomer. The compensating element connects the strut to the front wheel swing arm and allows the strut to pivot with respect to the front wheel swing arm. This allows a change in angle between the strut and the front wheel swing arm when the front wheel is deflected.

According to a further embodiment, the folding bicycle has a headset bearing by means of which the front wheel is mounted in a rotatable manner about a fourth axis in order to steer the folding bicycle. In order to adjust the folding bicycle between a riding position and a transporting position thereof, the front wheel is pivotable in opposite directions about the third and fourth axes. As a result, a particularly favorable packing size can be achieved.

In order to adjust the folding bicycle between a riding position and a transporting position thereof, provision can be made for the front wheel to be pivotable in a first step about the first axis in the direction of travel. In this case, the front wheel can be provided to be pivotable through under the first axis. Provision can also be made for the folding bicycle to have a headset bearing by means of which the front wheel is mounted in a rotatable manner about a fourth axis in order to steer the folding bicycle and, in order to adjust the folding bicycle between the riding position and the transporting position thereof, for the front wheel to be pivotable in a second step in opposite directions about the third and fourth axes.

In order to adjust the folding bicycle between a riding position and a transporting position thereof, provision can be made for the rear wheel to be pivotable in a first step about the second axis in the direction of travel. In this case, the rear wheel can be provided to be pivotable through under the second axis. In order to adjust the folding bicycle between the riding position and the transporting position thereof, provision can be made for the front wheel to be pivotable in a second step about the first axis in the direction of travel. In this case, the front wheel can be provided to be pivotable through under the first axis. Provision can also be made for the folding bicycle to have a headset bearing by means of which the front wheel is mounted in a rotatable manner about a fourth axis in order to steer the folding bicycle and, in order to adjust the folding bicycle between the riding position and the transporting position thereof, for the front wheel to be pivotable in a third step in opposite directions about the third and fourth axes.

Furthermore, a method for adjusting the folding bicycle according to the invention between a riding position and a transporting position thereof is provided. In this case, the front wheel is pivoted about the first axis, the rear wheel is pivoted about the second axis and the front wheel and/or rear wheel is pivoted about the third axis.

In order to adjust the folding bicycle between a riding position and a transporting position thereof, provision can be made for the front wheel to be pivoted in a first step about the first axis in the direction of travel. In this case, the front wheel can be pivoted through under the first axis. Provision can also be made for the folding bicycle to have a headset bearing by means of which the front wheel is mounted in a rotatable manner about a fourth axis in order to steer the folding bicycle and, in order to adjust the folding bicycle between the riding position and the transporting position thereof, for the front wheel to be pivoted in a second step in opposite directions about the third and fourth axes.

In order to adjust the folding bicycle between a riding position and a transporting position thereof, provision can be made for the rear wheel to be pivoted in a first step about the second axis in the direction of travel. In this case, the rear wheel can be pivoted through under the second axis. In order to adjust the folding bicycle between the riding position and the transporting position thereof, provision can be made for the front wheel to be pivoted in a second step about the first axis in the direction of travel. In this case, the front wheel can be pivoted through under the first axis. Provision can also be made for the folding bicycle to have a headset bearing by means of which the front wheel is mounted in a rotatable manner about a fourth axis in order to steer the folding bicycle and, in order to adjust the folding bicycle between the riding position and the transporting position thereof, for the front wheel to be pivoted in a third step in opposite directions about the third and fourth axes.

Where the terms "first", "second" or "third" step are used in the present case, this could equally well be formulated as: "first of all", "in a further step" or "in yet a further step".

The invention is explained in more detail in the following text by way of embodiments with reference to the accompanying figures of the drawing, in which:

FIGS. 12A and 12B show perspective views of the folding bicycle from FIGS. 1A and 1B, wherein a strut is coupled to a spring (not shown) by means of a coupling piece;

Figure 13:
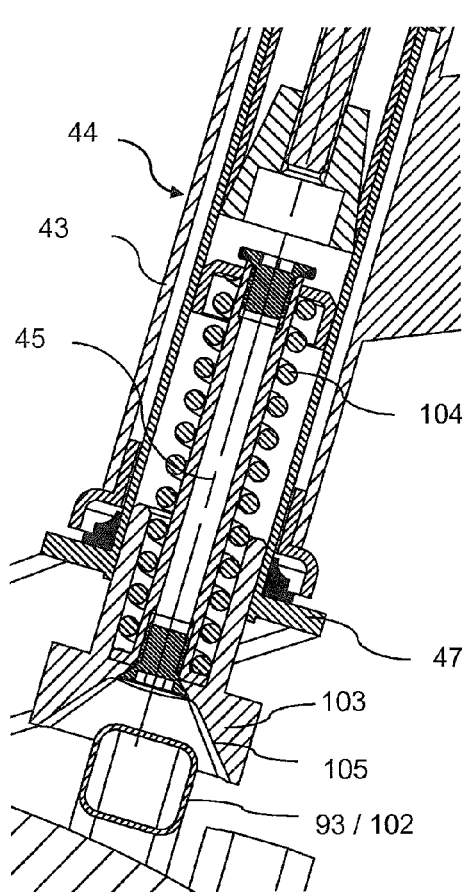
Figure 13:
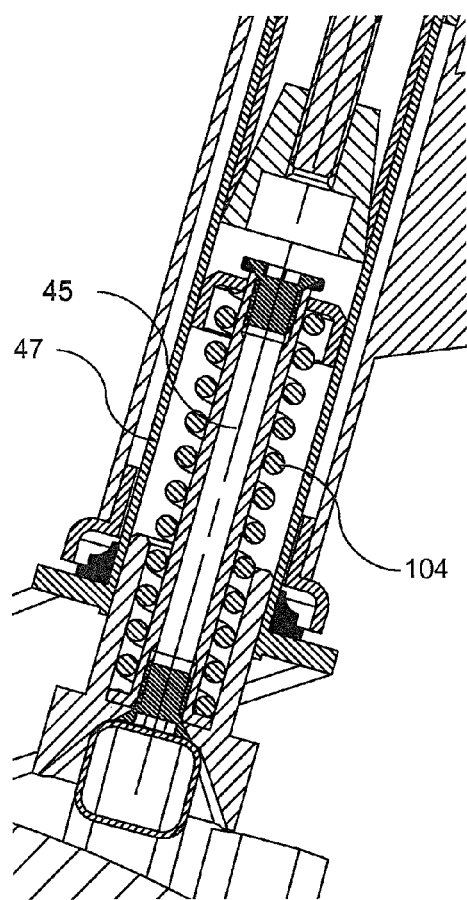
Figure 14:
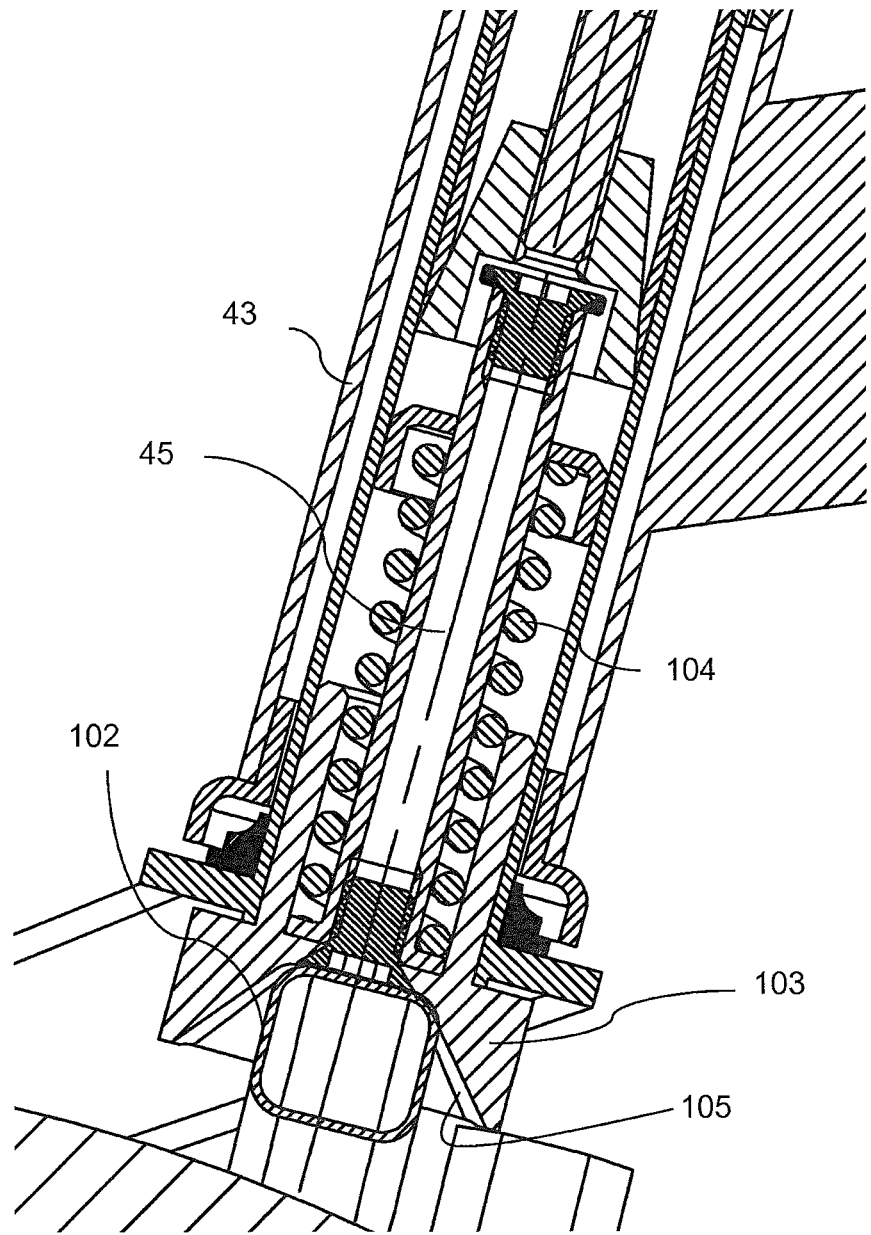
Figure 15:
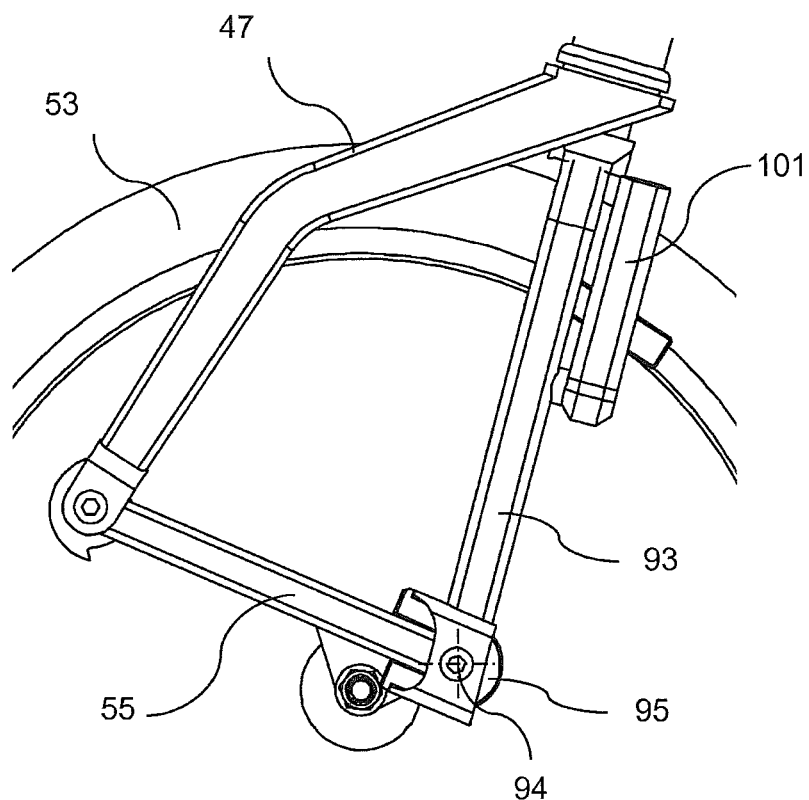
Figure 15:
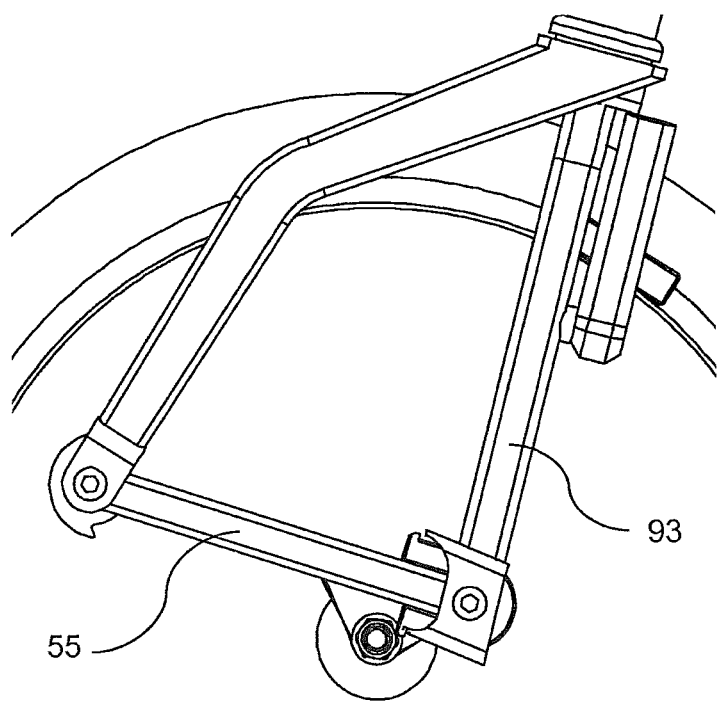
Figure 16:
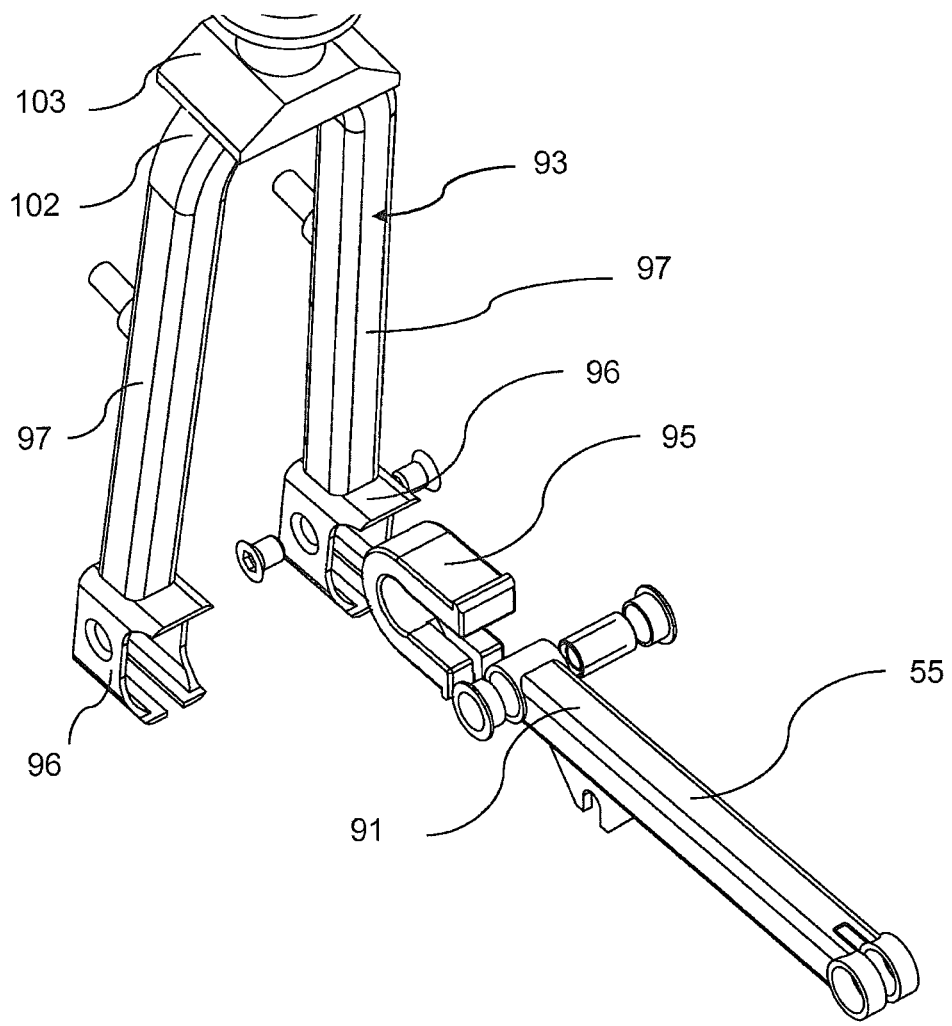

FIGS. 13A and 13B approximately show a section XIII-XIII from FIG. 12A and FIG. 12B, respectively;

FIG. 14 shows the view from FIG. 13B in the deflected state;

FIGS. 15A and 15B show a front wheel swing arm together with strut and further components in the non-deflected and deflected states in an enlarged side view from FIG. 12A; and FIG. 16 shows an exploded illustration of the front wheel swing arm, strut and further components from FIG. 15A.

In the figures, identical reference signs denote identical or functionally identical components, unless stated to the contrary.

Figure 1:
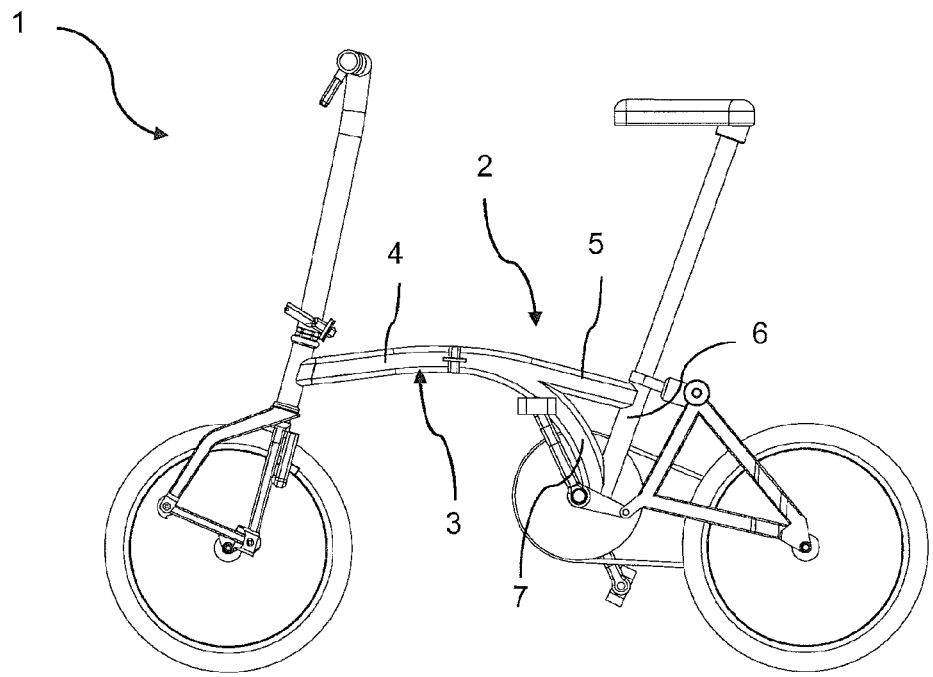
FIGS. 1A and 1B show side views of a folding bicycle according to one embodiment in a riding position.
Figure 1:
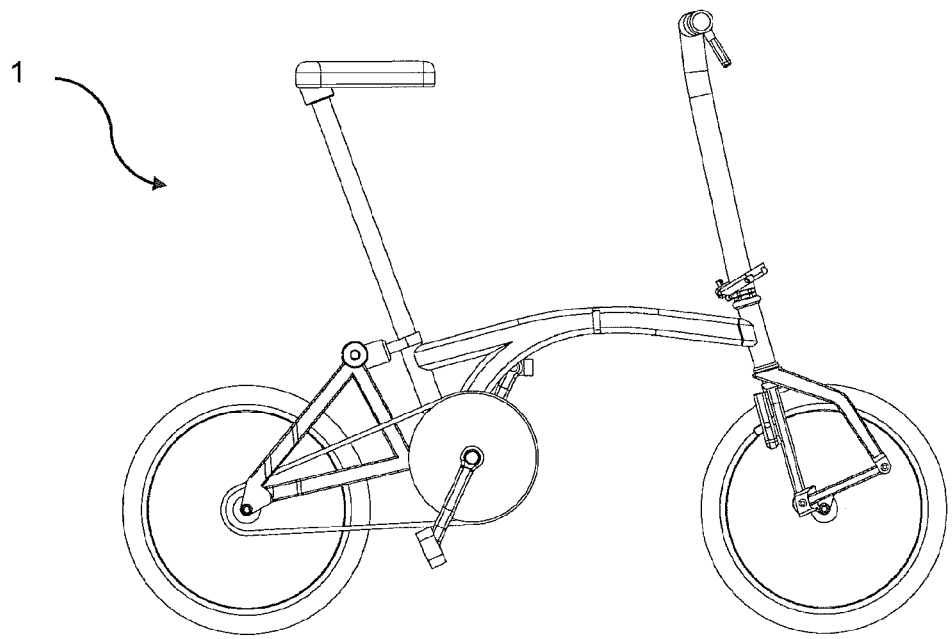
Figure 2:
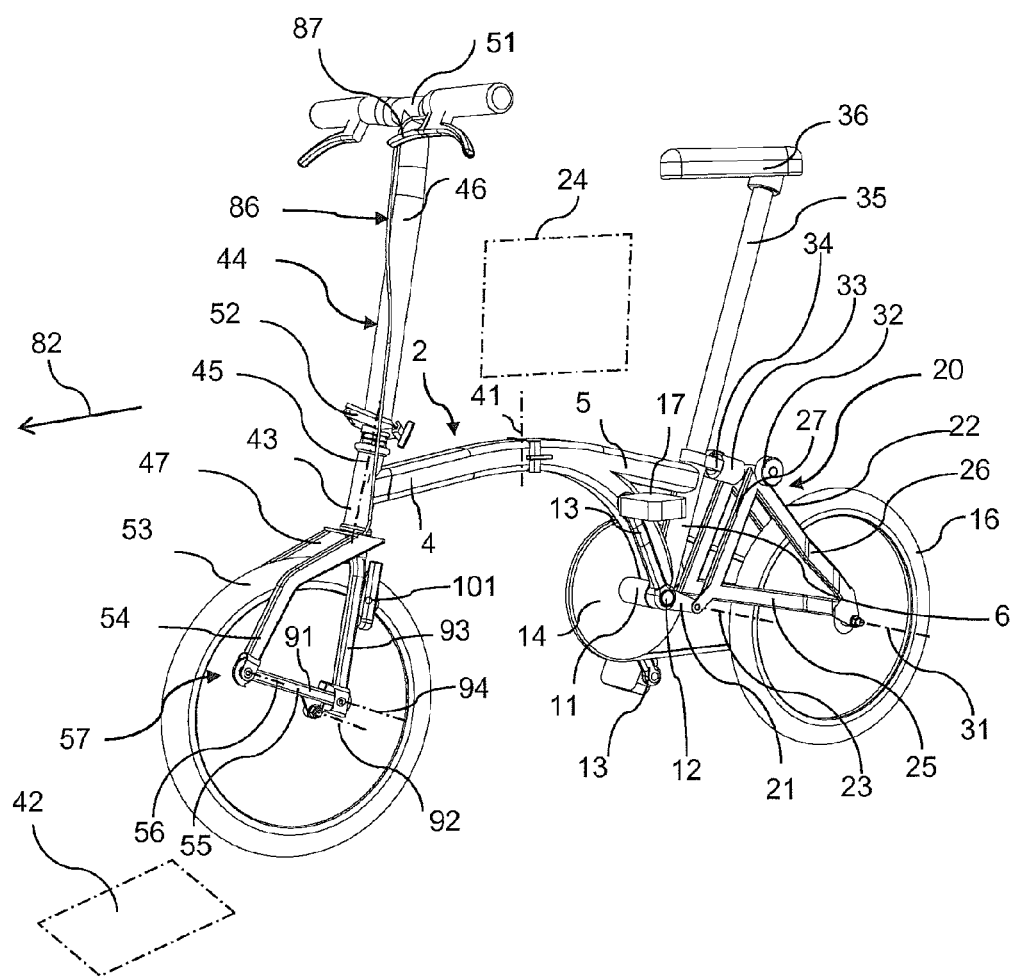
FIGS. 2A and 2B show perspective views of the folding bicycle from FIGS. 1A and 1B.
Figure 2:
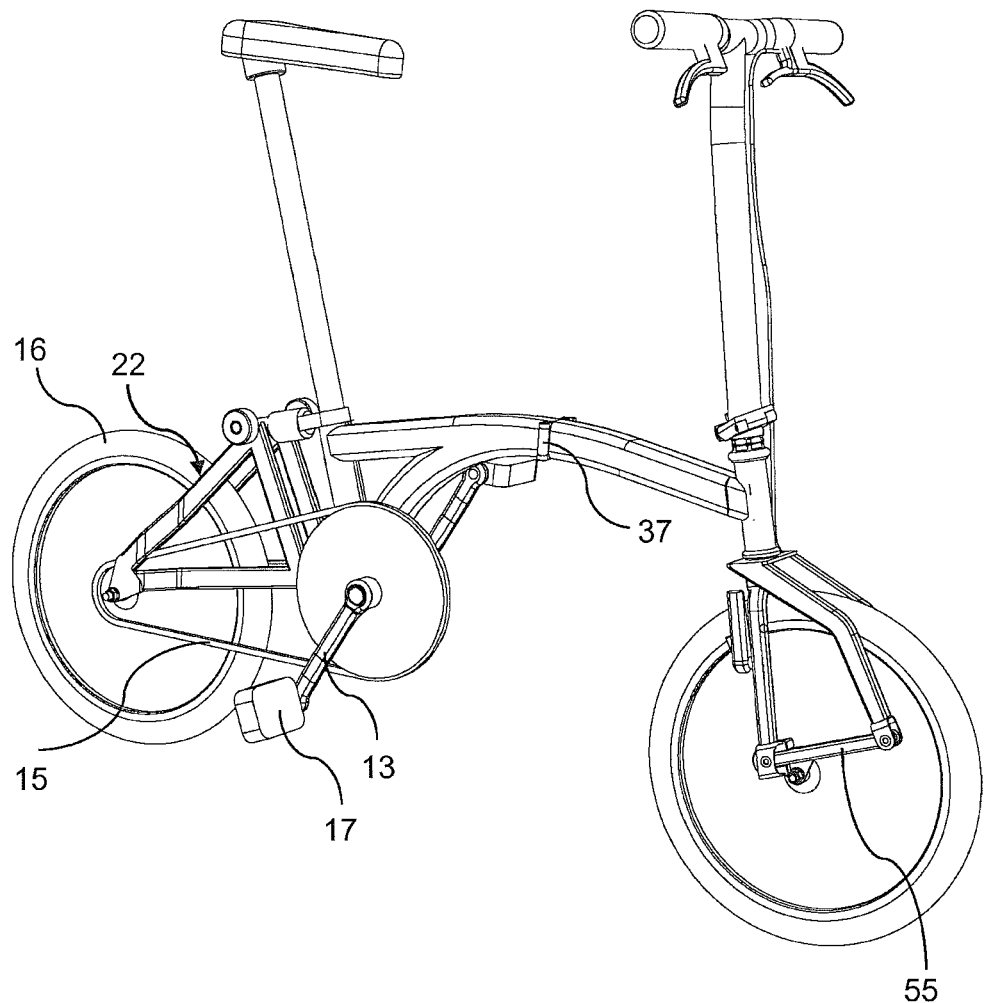
Figure 3:
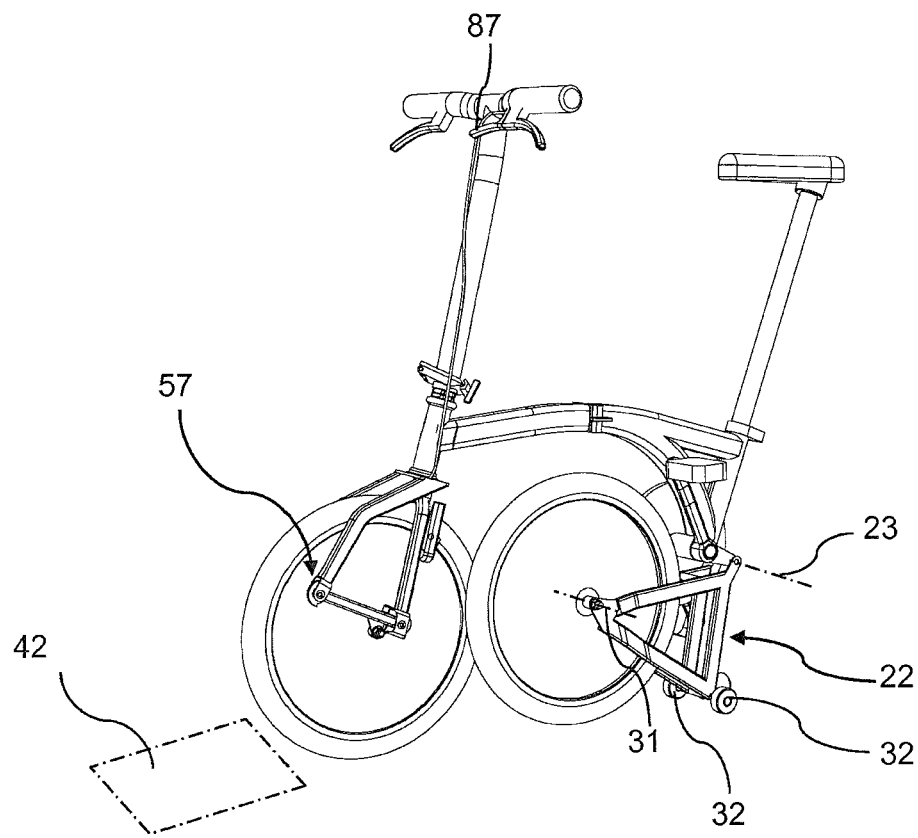
FIGS. 3A and 3B show the views from FIGS. 2A and 2B with a pivoted rear wheel.
Figure 3:
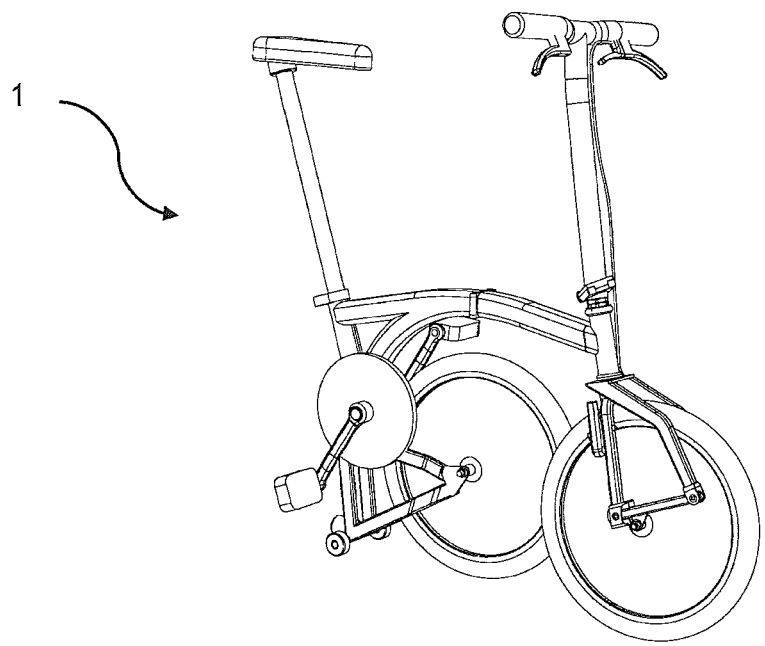
Figure 4:
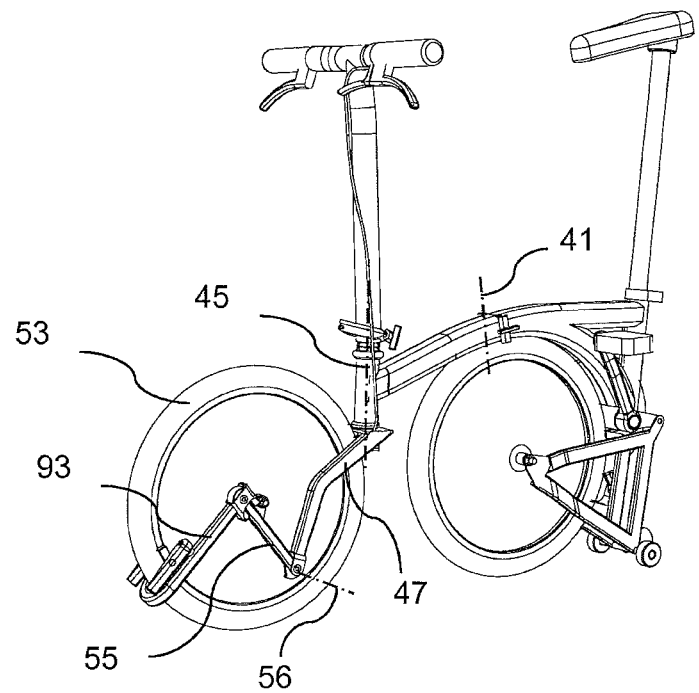
FIGS. 4A and 4B show the views from FIGS. 3A and 3B with a pivoted front wheel.
Figure 4:
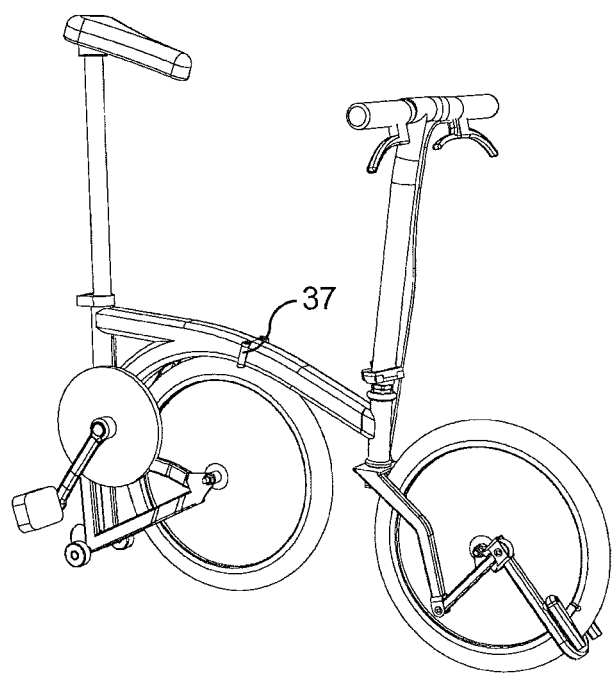
Figure 5:
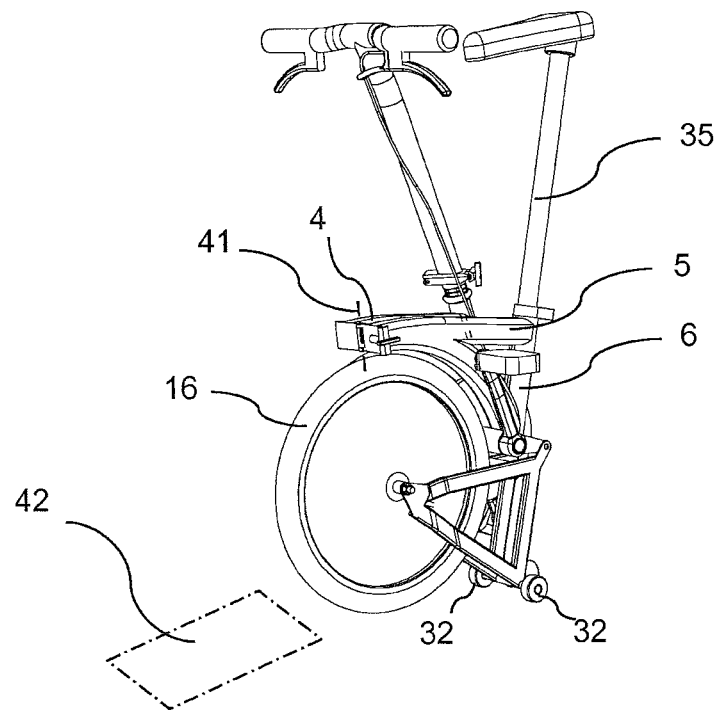
FIGS. 5A and 5B show the views from FIGS. 4A and 4B with a folded top frame tube.
Figure 5:
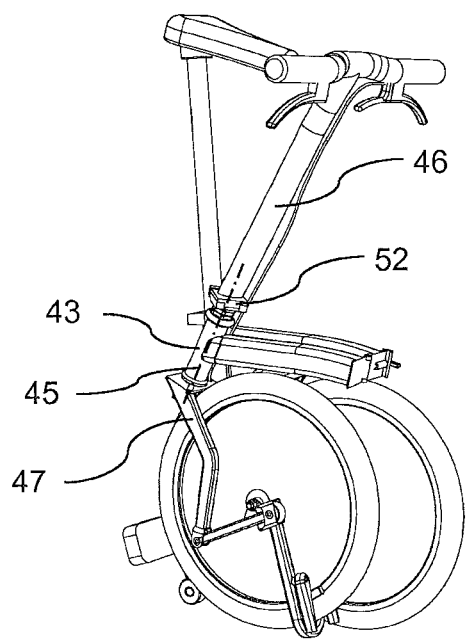

FIGS. 1A and 1B each show a side view of a folding bicycle 1 according to one embodiment. FIGS. 2A and 2B show perspective views of the folding bicycle 1 from FIGS. 1A and 1B. The folding bicycle 1 according to FIGS. 1A to 2B is in a riding position. In the riding position, the folding bicycle 1 can be mounted and ridden by a user. FIGS. 3A to 6B show perspective views of various intermediate positions of the folding bicycle 1 while the latter is being folded together, starting from the riding position to a transporting position shown in FIGS. 7A to 8D. FIGS. 7A and 7B in this case perspectively show the folding bicycle 1 in the transporting position, while FIGS. 8A to 8D illustrate various parallel projections of the folding bicycle 1 in the transporting position.

Returning now to FIG. 1A, the latter shows that the folding bicycle 1 comprises a frame 2. The frame 2 is composed for example of a top frame tube 3 which comprises a first section 4 and a second section 5. The section 5 of the top frame tube 3 can define a triangular frame with a seatpost bearing 6 and a bottom frame tube 7. The seatpost bearing 6 and the bottom frame tube 7 converge in a corner of the triangular frame, said corner having a cradle 11 for a bottom bracket (not illustrated). Mounted in the bottom bracket is a shaft 12, see FIG. 2A. The shaft 12 is connected to crank arms 13 and a chain ring 14. The chain ring 14 drives a rear wheel 16 of the folding bicycle 1 via a chain 15, see FIG. 2B. Pedals 17 are in each case arranged at the ends of the crank arms 13. However, other configurations of the drive, that is to say of the shaft 12, the crank arm 13, the chain ring 14, the chain 15 and the pedals 17, are also conceivable.

Two arms 21 (the second arm 21 cannot be seen in any of the figures) are firmly attached to the cradle 11, see FIG. 2A. A double swing arm 20 is attached to the arms 21 in a manner mounted pivotably about an axis 23. The axis 23 extends perpendicularly to a main extension plane 24 of the frame 2. The position of the main extension plane 24 is in this case defined by the position of the abovementioned triangular frame.

The double swing arm 20 comprises two rear wheel swing arms 22 which are connected together via cross members (not shown in more detail) and receive the rear wheel 16 between one another. Each of the rear wheel swing arms 22 can be composed of a first section 25, a second section 26 and a third section 27 which form a triangular shape. The sections 25 and 27 in this case form a corner, in the region of which the axis 23 is formed. The sections 25 and 26 form the corner which defines a rotation axis 31 of the rear wheel 16. During riding, the rear wheel 16 rotates about the rotation axis 31. The sections 26 and 27 together form a corner which supports a roller 32. At the corner in which the second and third sections 26, 27 run together, the double swing arm 20 has a damping element 33 that is attached there. The damping element 33 is supported on the seatpost bearing 6 via a stop 34.

One end of a seatpost 35 is received in the seatpost bearing 6. At its other end, the seatpost 35 carries a saddle 36.

The section 4 of the top frame tube 3 is pivotably connected to the section 5 of the top frame tube 3 by means of an articulation 37. A corresponding axis 41 of the articulation 37 extends perpendicularly to the roadway plane 42. In the riding position, however, the articulation 37 is fixed such that pivoting about the axis 41 is prevented. The first and second sections 4, 5 are formed with the same length. However, this is intended to include length differences of a few centimeters, for example of less than 5 cm.

The section 4 connects the section 5 to a headset bearing 43. In the headset bearing 43, a head tube 44 is held so as to be rotatable about an axis 45. The axis 45 extends for example at an angle of between 90 and 60° to the roadway plane 42. The head tube 44 comprises a first section 46 and a second section 47. At its one end, the section 46 has a handlebar 51 and at its other end is connected to the section 47 via an articulation 52. The articulation 52 is arranged above the headset bearing 43. The section 47 is configured in the form of a front wheel fork which receives a front wheel 53. The front wheel fork 47 is formed in an elbowed manner in the main extension plane 24. A front wheel swing arm 55 is arranged at each of the free ends 54 of the front wheel fork 47.

For the sake of simplicity, the following explanations refer only to one of the front wheel swing arms 55, but apply equally to the other front wheel swing arm 55. The front wheel swing arm 55 shown in FIG. 2A is articulated to the free end 54 of the front wheel fork 47 so as to be pivotable about an axis 56. The axis 56 extends perpendicularly to the main extension plane 24. However, provision can be made of a fixing device 57, shown in FIG. 9, by means of which different pivoted positions of the front wheel 53, or of the front wheel swing arm 55, about the axis 56 are defined.

Figure 9:
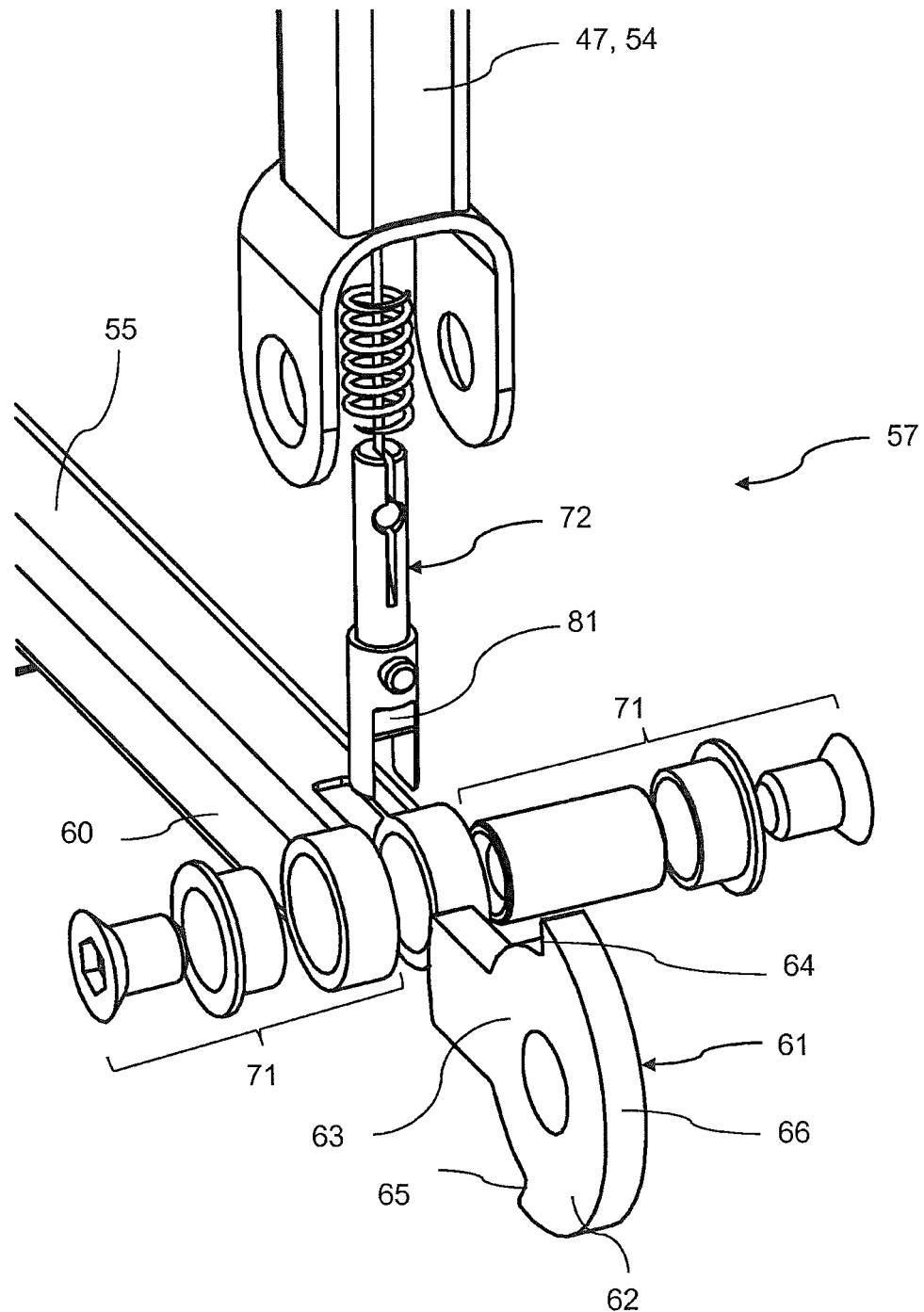
FIG. 9 shows an exploded illustration of a fixing device of the folding bicycle according to FIGS. 1A and 1B.

The fixing device 57 comprises a detent disk 61. The detent disk 61 is firmly connected to one end 60 of the front wheel swing arm 55, although this cannot be seen in the exploded view in FIG. 9. However, this is shown in FIGS. 11A to 11D. The detent disk 61 is composed of a first circle segment 62 and a second circle segment 63. The circle segment 62 has a larger radius than the circle segment 63. The circle segments 62, 63 are set against one another such that two detents in the form of steps 64, 65 result. For example, the circle segments 62, 63 can each be formed in a semicircular form for this purpose. Along its circumference 66, the circle segment 62 can have a larger circumference for example centrally (a corresponding location is designated 67 in FIG. 11A) than in the region of the steps 64, 65. FIG. 9 shows a set of fastening elements 71 for connecting the detent disk 61 in a rotationally fixed manner to the end 60 of the front wheel swing arm 60.

Figure 10:
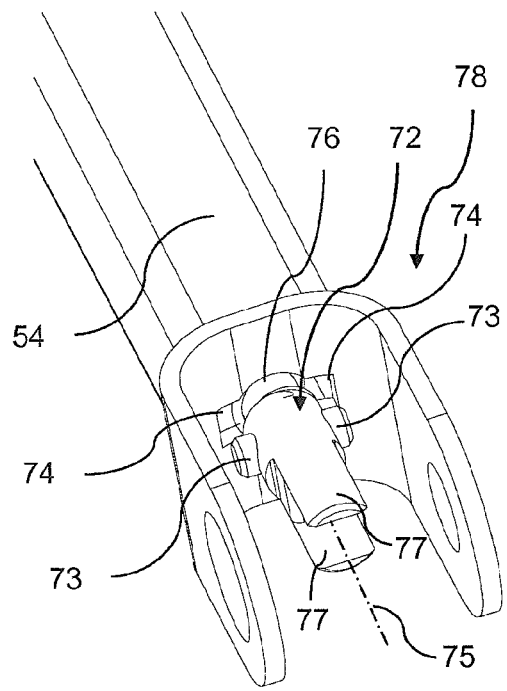
FIGS. 10A to 10C show different states during the insertion of a locking element of the fixing device from FIG. 9.
Figure 10:
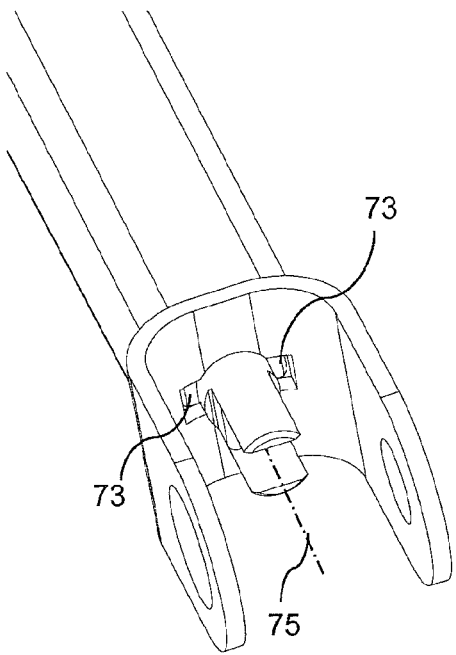
Figure 10:
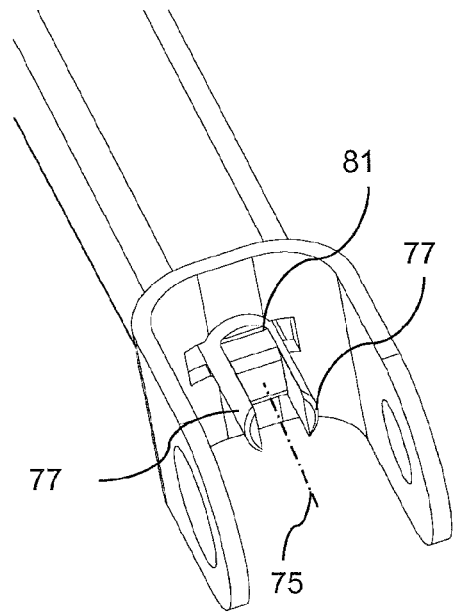

The fixing device 57 furthermore has a locking element guided therein in the form of a pin 72. As is illustrated in FIGS. 10A to 10C, the pin 72 has radially outwardly directed projections 73. Recesses 74 which correspond to the projections 73 are formed in the end 54. The pin 72 is, as shown in FIGS. 10A and 10B, first of all pushed along its longitudinal axis 75 into a circular opening 76 in the end 54. The recesses 74 radially widen the opening 76 such that the projections 73 also pass through the opening 76 (see FIG. 10B). Subsequently, the pin 72 is rotated about its longitudinal axis 75 (see FIG. 10C). In this way, the pin 72 is secured against falling out. This manner of connection between the pin 72 and the end 54 is designated a bayonet closure 78 in the present case.

The pin 72 has two tines 77 as shown in FIG. 10C. The tines 77 receive the detent disk 61 between one another, as illustrated for example in FIG. 11A. As a result, the pin 72 is prevented from rotating about the longitudinal axis 75 such that the pin 72 cannot detach and the bayonet closure 78 cannot be lifted. Between the tines 77, the pin 72 has a stop 81, see FIG. 10C. In the first locking position, shown in FIG. 11A, of the fixing device 57, the stop 81, interacting with the step 64, prevents the front wheel swing arm 55 from rotating in the clockwise direction, that is to say toward the front or in the direction of travel 82, see FIG. 2A. By contrast, in the second locking position, shown in FIG. 11C, of the fixing device 57, the step 65 interacts with the stop 81 such that pivoting of the front wheel swing arm 55 counterclockwise, that is to say initially toward the front or in the direction of travel 82 (in other words: toward the roadway plane 42) and ultimately toward the rear or counter to the direction of travel 82, is blocked.

Figure 11:
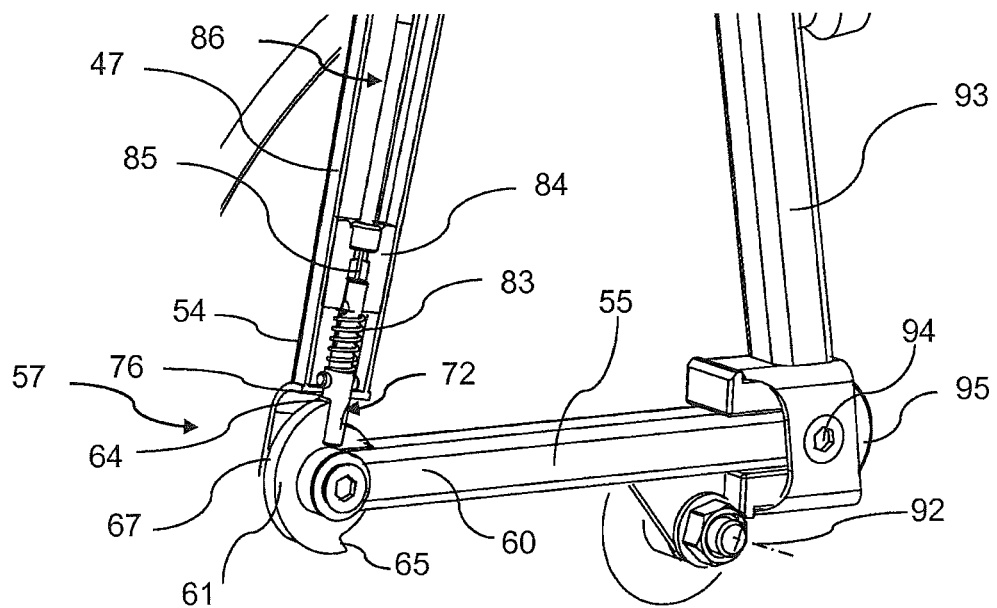
FIGS. 11A to 11D show perspective and partially broken away views of the folding bicycle front part in various states of the fixing device from FIG. 9.
Figure 11:
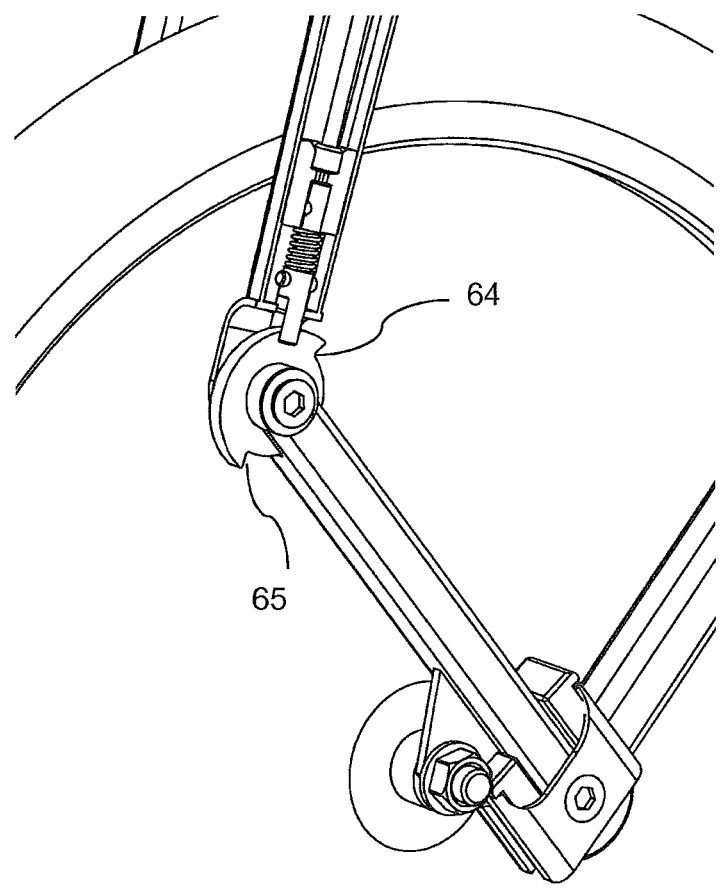
Figure 11:
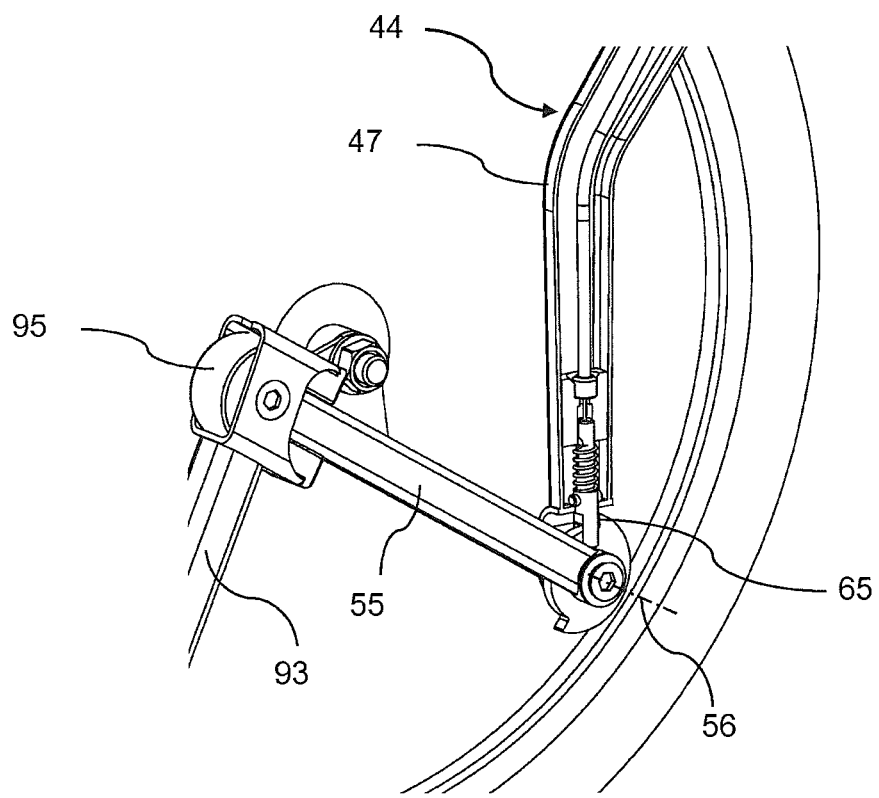
Figure 11:
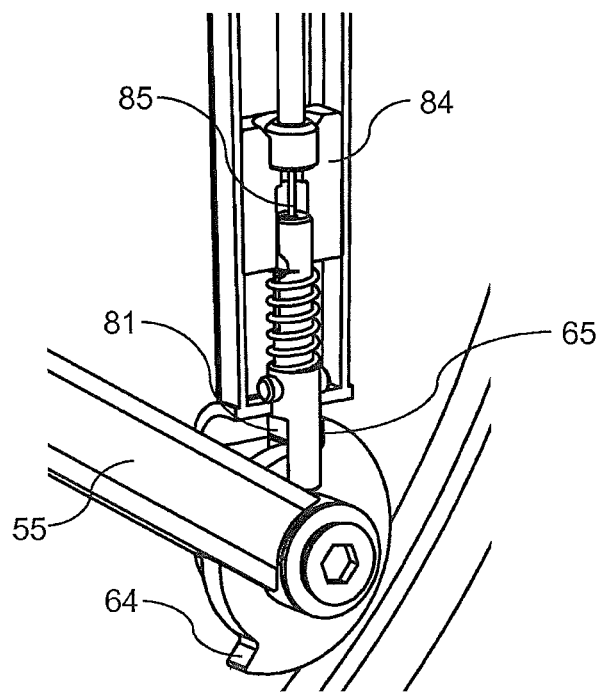

As shown in FIG. 11A, the pin 72 is supported on a counterbearing 84 by means of a compression spring 83. A cable 85 of a cable pull 86 of the folding bicycle 1 is attached to the pin 72. The cable pull 86 is sectionally guided in the front wheel fork 47. Furthermore, the cable pull 86 is guided toward the handlebar 51, for example on the outer side of the section 46 of the head tube 44, see FIG. 2A. Attached to the handlebar 51 is a lever 87 of the cable pull 86, by means of which lever 87 the cable 85 can be manually shortened by a user. This shortening results in the pin 72 being drawn into the end 54 of the front wheel fork counter to the action of the spring 83 and in the process—depending on the position of the front wheel swing arm 55—the stop 81 disengaging from the step 64 or the step 65. The spring 83 in turn has the effect that when the lever 87 is not actuated, the pin 72 or the stop 81 snaps behind the step 64 or step 65, respectively, when the latter is passed over.

Returning now to FIG. 2A, the latter shows that the front wheel swing arm 55 supports at its other end 91 the front wheel 53 in a manner mounted rotatably about an axis 92.

Furthermore, at the other end 91, a strut 93 is attached so as to be mounted pivotably about an axis 94 perpendicularly to the frame plane 24. The strut 93 can be formed in a U-shaped manner, as illustrated in more detail in FIG. 16. As is also shown in FIG. 16, which illustrates an exploded view, provision is made of a U-shaped compensating element 95. The compensating element 95 can be formed from an elastomer. The compensating element 95 is pushed onto the end 91 of the front wheel swing arm 55. The end 91 is then received between the limbs of the compensating element 95. The compensating element 95, together with the end 91, is pushed into a profile 96 at a free end of a limb 97 of the strut 93 and screw-connected there.

A brake 101 is arranged on the strut 93, in particular on a given limb 97 thereof, as illustrated in FIG. 2A. A given brake jaw of the brake 101 can in this case be assigned to a given limb 97, as indicated in FIG. 16.

Furthermore, FIG. 16 shows that the strut 97, in particular a central section 102 between the limbs 97, rests against a coupling element 103. The coupling element 103 and the interaction thereof with the strut 91 is illustrated in FIGS. 12A to 13B. The coupling element 103 is supported via a spring 104 on the front wheel fork 47. The coupling element 103 has insertion bevels 105 which prevent the central section 102 of the strut 93 from unintentionally releasing from its engagement, shown in FIG. 13B, with the coupling element 103. The spring 104 extends into the headset bearing 43. A deflection, shown in FIG. 14, takes place along the axis 45, wherein the coupling section 103 is moved into the headset bearing 43.

As illustrated in FIGS. 15A and 15B, the compensation element 95 allows a change in angle between the front wheel swing arm 55 and the strut 93 during the deflection of the front wheel 53, wherein the spring 104 is compressed. The front wheel fork 47, the front wheel swing arm 55, the strut 93 and the brake 101 are in this case arranged such that the braking torque is introduced into the coupling element 103 from the strut 93 in a manner substantially perpendicular to the deflection direction (that is to say along the axis 45) and thus increased deflection of the front wheel 53 during the braking operation is prevented.

The procedure during the folding together of the folding bicycle 1 from its riding position into its transporting position will now be explained.

In the riding position, shown in FIGS. 1A to 2B, of the folding bicycle 1, the user lifts the rear part of the bicycle, wherein the double swing arm 20 together with the rear wheel 16 is pivoted about the axis 23 in the direction of travel 82. The damper 33 in this case comes out of abutment with the stop 34. According to one embodiment, provision can be made of a device which has to be released in order that the damper 33 can move away from the stop 34, in order to prevent accidental pivoting of the double swing arm 20.

Since the center of gravity of the double swing arm 20 together with the rear wheel 16 is located behind the axis 23, the double swing arm 20 together with the rear wheel 16 pivots about the axis 23 on account of the action of gravitational force. When the user now lowers the folding bicycle rear part again at the right time, the rear wheel 16 together with the double swing arm 20 pivots further about the axis 23, such that the rotation axis 31 of the rear wheel 16 comes to lie in front of the axis 23, as is illustrated in FIGS. 3A and 3B. Furthermore, the rollers 32 thus come into contact with the roadway 42.

In a further step, the lever 87 is now actuated by the user, with the result that the fixing device 57 passes from its first locking position, shown in FIG. 11A, to its releasing position, shown in FIG. 11B, i.e. the stop 81 of the pin 72 comes out of engagement with the step 64. At the same time, the user lifts the folding bicycle front part. This has the result that the strut 93 comes out of its engagement with the coupling element 103, as illustrated in FIGS. 12A and 13A. The front wheel 53 now moves forward in the direction of travel 82, wherein it pivots about the axis 56, see FIG. 4A. In the process, the stop 81 of the pin 72 (see FIG. 9) slides over the circumference 66 of the detent disk 61, until the step 65 is passed over. At this moment, the fixing device 57 passes into its second locking position, as shown in FIGS. 11C and 11D. In the first and second locking positions, which correspond to a first and second pivoted position of the front wheel swing arm 55, the latter is arranged on different sides of the front wheel fork 47, as a comparison of FIGS. 11A and 11C shows. The angle between the strut 93 and the front wheel swing arm 55 remains unchanged in this case. The rotation axis 92 of the front wheel 53 is now no longer arranged behind the axis 56, as shown in FIG. 2A, but in front of the latter, as is illustrated in FIGS. 4A and 4B.

In a further step, the articulation 37 (see FIG. 4A) is now unblocked, and so pivoting about the axis 41 can take place, see FIG. 5A. Furthermore, the front wheel fork 47 is pivoted about the axis 45. The pivoting about the axes 41 and 45 takes place in opposite directions in this case. Thus, the first section 4 of the top frame tube 3 is folded onto the second section 5 of the top frame tube 3. Furthermore, the front wheel 53 is folded onto the rear wheel 16. In this way, the headset bearing 53 and the seatpost bearing 6 pass into the immediate vicinity of one another. The smallest distance between these can be for example less than 5 cm. The corresponding position of the folding bicycle 1 is shown in FIGS. 5A and 5B.

Figure 6:
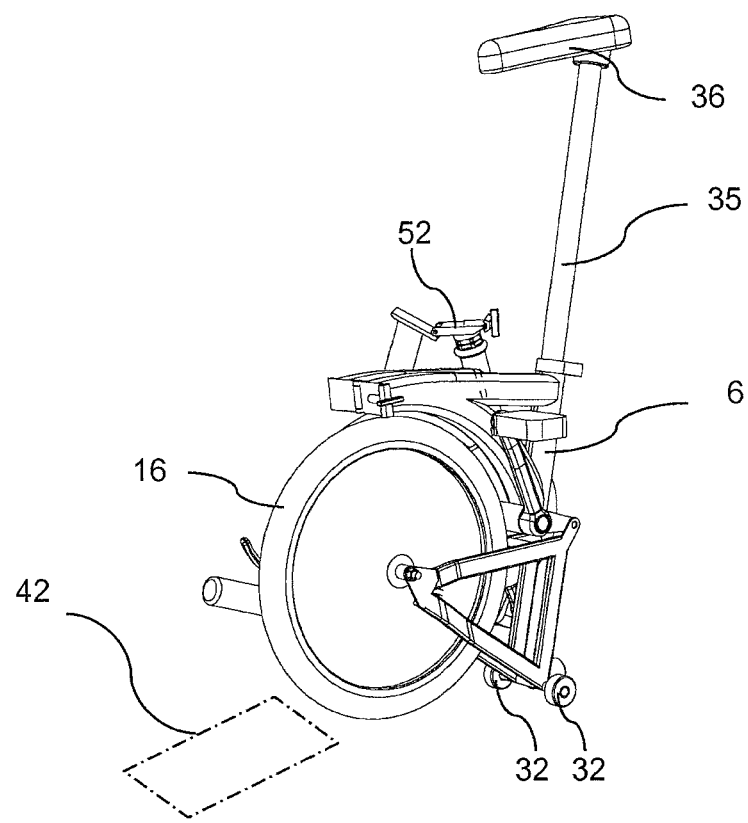
FIGS. 6A and 6B show the views from FIGS. 5A and 5B with a folded head tube.
Figure 6:
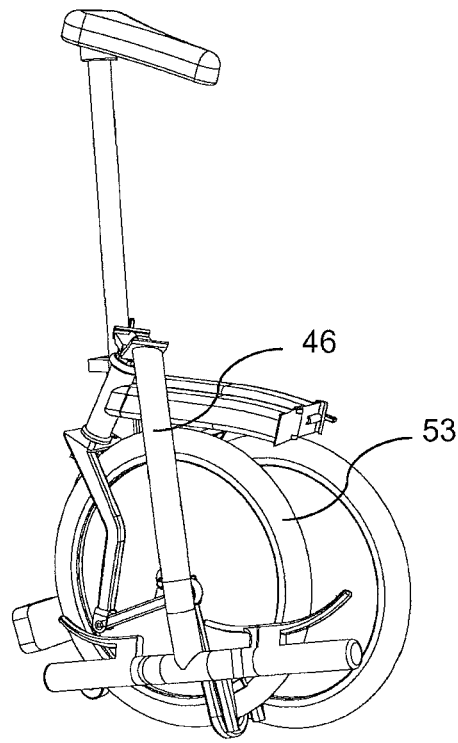
Figure 7:
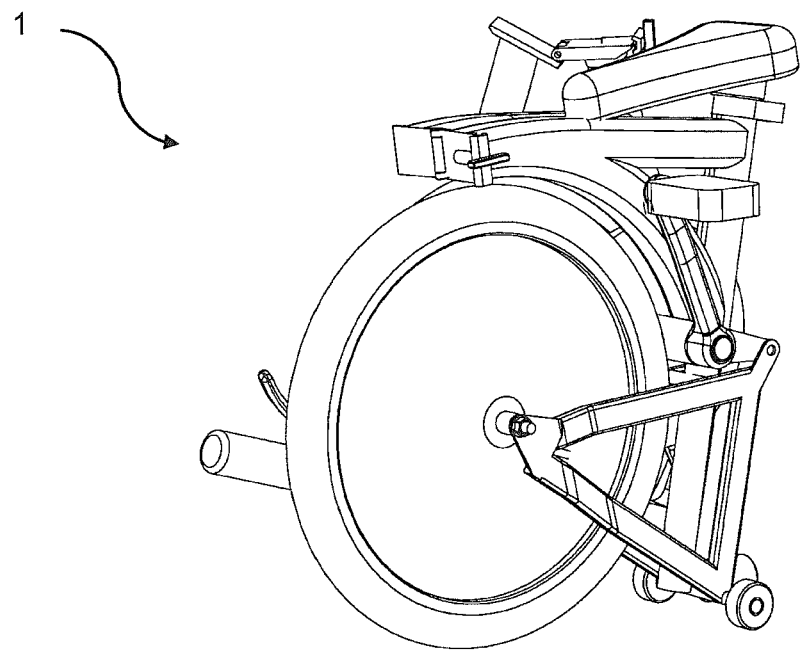
FIGS. 7A and 7B show the views from FIGS. 6A and 6B with a pushed-in seatpost.
Figure 7:
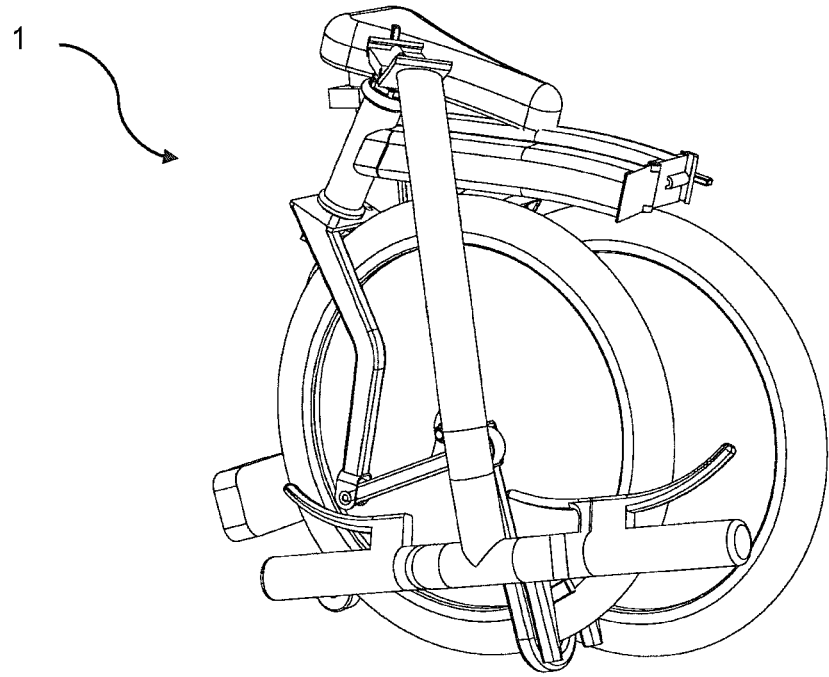
Figure 8:
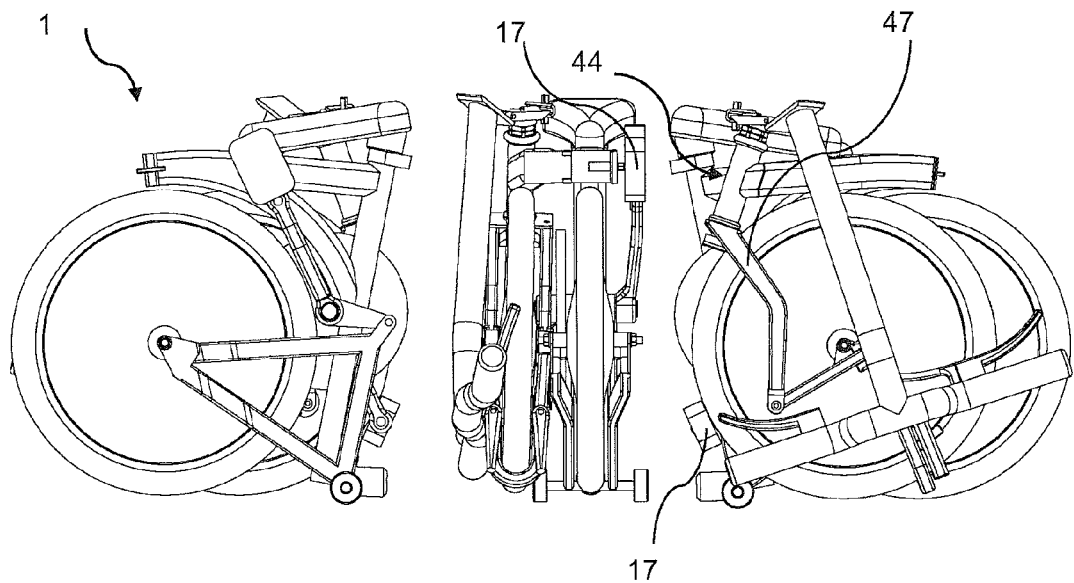
FIGS. 8A to 8D show different parallel projections of isometric views of the folding bicycle from FIGS. 7A and 7B.
Figure 8:
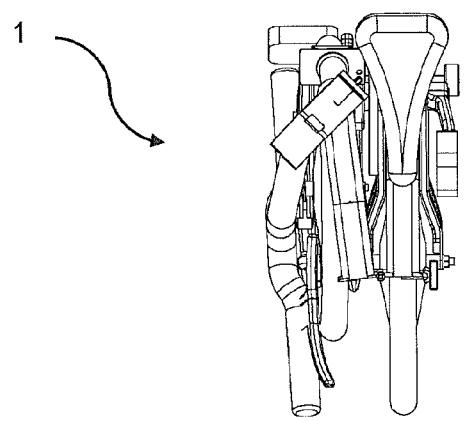

In a further step, the section 46 of the head tube 44 is now folded onto the front wheel 53, see FIGS. 5A to 6B. To this end, the articulation 52 is unlocked. In this position of the folding bicycle 1, a user can easily pull the latter behind him or her by gripping the saddle 36. There is three-point contact of the folding bicycle with the roadway 42. This three-point contact is formed by the two rollers 32 and the rear wheel 16, as is shown in FIGS. 6A and 6B.

Subsequently, the seatpost 35 is pushed into the seatpost bearing 6. In this way, the transporting position, shown in FIGS. 7A and 7B, of the folding bicycle 1 is achieved. FIGS. 8A to 8D show parallel projections of the folding bicycle 1 in the transporting position. It is clear for example from FIG. 8C that on account of the elbowed configuration of the front wheel fork 46, a collision between the latter and the pedal 17 is avoided. Preferably, at least one of the pedals 17 is folded in in order to further reduce the packing size.

Thus, an overall very favorable packing size of the folding bicycle 1 in the transporting position is achieved, allowing the latter to be accommodated in the longitudinal position in the trunk of a small vehicle or in a spare wheel well thereof.

When the folding bicycle 1 is adjusted from its transporting position into the riding position, the insertion struts 105, shown in FIG. 13A, ensure that the strut 93 automatically passes into engagement with the coupling element 103. However, adjustment from the riding position into the transporting position is preferably only possible when the user actuates the lever 87 in order as a result to move the fixing device 57 from its second locking position into the releasing position. From its releasing position, the fixing device 57 passes into its first locking position merely by pivoting of the front wheel 53 about the axis 56 when the pin 72 passes over the first step 64.

Although the invention has been described in the present case by way of preferred exemplary embodiments, it can be modified in a wide variety of ways. The embodiments and features explained with respect to the folding bicycle according to the invention apply in a corresponding manner to the method according to the invention.

LIST OF REFERENCE SIGNS

1 Folding bicycle
2 Frame

3 Top frame tube
4 Section
5 Section
6 Seatpost bearing
7 Bottom frame tube
11 Cradle
12 Shaft
13 Crank arm
14 Chain ring
15 Chain
16 Rear wheel
17 Pedal
20 Double swing arm
21 Arm
22 Rear wheel swing arm
23 Axis
24 Main extension plane
25 Section
26 Section
27 Section
31 Rotation axis
32 Roller
33 Damping element
34 Stop
35 Seatpost
36 Saddle
37 Articulation
41 Axis
42 Roadway plane
43 Headset bearing
44 Head tube
45 Axis
46 Section
47 Section
51 Handlebar
52 Articulation
53 Front wheel
54 End
55 Front wheel swing arm
56 Axis
57 Fixing device
60 End
61 Detent disk
62 Circle segment
63 Circle segment
64 Step
65 Step
66 Circumference
67 Location
71 Elements
72 Pin
73 Projection
74 Recess
75 Longitudinal axis
76 Opening
77 Tines
78 Bayonet closure
81 Stop
82 Direction of travel
83 Spring
84 Counterbearing
85 Cable
86 Cable pull
87 Lever
91 End
92 Rotation axis
93 Strut
94 Axis
95 Compensating element
96 Profile
97 Limb
101 Brake
102 Section
103 Coupling element
104 Spring
105 Insertion bevels

The invention claimed is:

1. A folding bicycle (1) having
a frame (2) which extends in a main extension plane (24),
a front wheel (53) which is pivotable about a first axis (56) extending perpendicularly to the main extension plane (24),
a rear wheel (16) which is pivotable about a second axis (23) extending perpendicularly to the main extension plane (24), wherein the frame (2) has an articulation (37) such that the front and rear wheels (53, 16) are pivotable with respect to one another about a third axis (41) extending perpendicularly to a roadway (42), and
a headset bearing (43) by means of which the front wheel (53) is mounted in a rotatable manner about a fourth axis (45) in order to steer the folding bicycle (1), wherein, in order to adjust the folding bicycle (1) between a riding position and a transporting position thereof, the front wheel (53) is pivotable in opposite directions about the third axis (41) and the fourth axis (45).

2. The folding bicycle as claimed in claim 1, wherein the frame (2) has a headset bearing (43) by means of which the front wheel (53) is rotatably mounted in order to steer the folding bicycle (1), and a seatpost bearing (6) which supports a seatpost (35), wherein the articulation (37) is arranged centrally in a direction of travel (82) between the headset bearing (43) and the seatpost bearing (6).

3. The folding bicycle as claimed in claim 2, which is adjustable between a riding position and a transporting position, wherein the headset bearing (43) and the seatpost bearing (6) are arranged alongside one another in the transporting position.

4. The folding bicycle as claimed in claim 1, wherein, in order to adjust the folding bicycle (1), the front wheel (53) is pivotable in a direction of travel (82) between a riding position and a transporting position of said folding bicycle (1).

5. The folding bicycle as claimed in claim 1, wherein, in order to adjust the folding bicycle (1), the rear wheel (16) is pivotable in a direction of travel (82) between a riding position and a transporting position of said folding bicycle (1).

6. The folding bicycle as claimed in claim 1, wherein, in order to adjust the folding bicycle (1) between a riding position and a transporting position thereof, the front wheel (53) is pivotable about the first axis (56) and the rear wheel (16) is pivotable about the second axis (23) in a same direction.

7. The folding bicycle as claimed in claim 1, which is adjustable between a riding position and a transporting position, wherein, at least in the riding position, a rotation axis (92) of the front wheel (53) is located behind the first axis (56).

8. The folding bicycle as claimed in claim 1, having a head tube (44) and a front wheel swing arm (55) which at its one end (60) is mounted pivotably on the head tube (44) and at its other end (91) supports the front wheel (53) in a rotatably mounted manner, wherein, in order to adjust the folding bicycle (1) between a riding position and a transporting position thereof, the front wheel swing arm (55) is pivotable between a first pivoted position, in which a rotation axis (92) of the front wheel (53) is arranged on one side of the head tube (44), and a second pivoted position, in which the rotation axis (92) of the front wheel (53) is arranged on the other side of the head tube (44).

9. The folding bicycle as claimed in claim 8, having a fixing device (57) for fixing the front wheel swing arm (55) in at least one of: the first pivoted position or the second pivoted position.

10. The folding bicycle as claimed in claim 9, wherein the fixing device (57) has a locking position, in which the front wheel (53) is prevented from pivoting between the first and second pivoted positions, and a releasing position in which the front wheel (53) is allowed to pivot between the first and second pivoted positions, wherein the folding bicycle (1) comprises a cable pull (86) by means of which the fixing device (57) is adjustable between the locking position and the releasing position.

11. The folding bicycle as claimed in claim 10 having at least one of:
    (a) the cable pull (86) has a lever (87), arranged on a handlebar (51), for adjusting the fixing device (57) between the locking position and the releasing position; or
    (b) the fixing device (57) has a detent disk (61) fastened to the front wheel swing arm (55), and a locking element (72) that is guided in a linear manner in or on the head tube (44) and is adjustable by means of the cable pull (86), said locking element (72) being in engagement with a detent (64, 65) of the detent disk (61) in the locking position of the fixing device (57) and being disengaged from the detent (64, 65) in the releasing position.

12. The folding bicycle as claimed in claim 11, wherein the locking element (72) is secured against falling out by means of a bayonet closure (78) in the head tube (44) and the detent disk (61) prevents the locking element (72) from rotating in order to release the bayonet closure (78).

13. The folding bicycle as claimed in claim 1, wherein, in order to adjust the folding bicycle (1) between the riding position and the transporting position thereof, the front wheel (53) is pivotable in a first step about the first axis (56) in the direction of travel (82), and the front wheel (53) is pivotable in a second step in opposite directions about the third and fourth axes (41, 45).

14. The folding bicycle as claimed in claim 1, which is adjustable between a riding position and a transporting position and has a head tube (44) and a front wheel swing arm (55) with two ends, wherein a first end (60) is mounted pivotably on the head tube (44) and a second end (91) which supports the front wheel (53) in a rotatably mounted manner, wherein the head tube (44) is cranked in the main extension plane (24) in the riding position of the folding bicycle (1) in order to leave room for at least one of: a pedal (17) or a bottom bracket cradle (11) of the folding bicycle (1) in the transporting position of the folding bicycle (1).

15. The folding bicycle as claimed in claim 1, having a head tube (44), a front wheel swing arm (55) with two ends, and a spring (104); wherein a first end (60) of the front wheel swing arm is mounted pivotably on the head tube (44), a second end (91) supports the front wheel (53) in a rotatably mounted manner, and the front wheel swing arm (55) is supported on the head tube (44) by the spring (104).

16. The folding bicycle as claimed in claim 15, having at least one of:
    (a) a headset bearing (43) which holds the head tube (44) in a rotatably mounted manner with respect to the frame (2), wherein the spring (104) is arranged at least partially within at least one of: the head tube (44) or the headset bearing (43); or
    (b) a strut (93) which is supported by the front wheel swing arm (55) and the spring (104), wherein provision is made of a coupling element (103) which acts against the spring (104) and has an insertion bevel (105) for receiving the strut (93).

17. The folding bicycle as claimed in claim 16, having an elastomer compensating element (95), which connects the strut (93) to the front wheel swing arm (55) and allows the strut (93) to pivot with respect to the front wheel swing arm (55).

18. The folding bicycle as claimed in claim 1, wherein, in order to adjust the folding bicycle (1) between the riding position and the transporting position thereof, the rear wheel (16) is pivotable in a first step about the second axis (23) in the direction of travel (82), the front wheel (53) is pivotable in a second step about the first axis (56) in the direction of travel (82), and the front wheel (53) is pivotable in a third step in opposite directions about the third and fourth axes (41, 45).

19. A method for adjusting a folding bicycle (1) as claimed in claim 1 between a riding position and a transporting position thereof, wherein
    the front wheel (53) is pivoted about the first axis (56),
    the rear wheel (16) is pivoted about the second axis (23), and
    the front wheel or rear wheel (53, 16) is further pivoted about the third axis (41) relative to the other of the front wheel or the rear wheel.

20. The method as claimed in claim 19, wherein, in order to adjust the folding bicycle (1) between the riding position and the transporting position thereof, the front wheel (53) is pivoted in a first step about the first axis (56) in a direction of travel (82), and the front wheel (53) is pivoted in a second step in opposite directions about the third and fourth axes (41, 45).

21. The method as claimed in claim 19, wherein, in order to adjust the folding bicycle (1) between the riding position and the transporting position thereof, the rear wheel (16) is pivoted in a first step about the second axis (23) in a direction of travel (82), the front wheel (53) is pivoted in a second step about the first axis (56) in the direction of travel (82), and, the front wheel (53) is pivoted in a third step in opposite directions about the third and fourth axes (41, 45).

* * * * *